(12) United States Patent
Lai

(10) Patent No.: US 7,845,808 B2
(45) Date of Patent: Dec. 7, 2010

(54) ILLUMINATING DEVICE

(75) Inventor: Chih-Ming Lai, Miao-Li Hsien (TW)

(73) Assignee: Foxsemicon Integrated Technology, Inc., Chu-Nan, Miao-Li Hsien (TW)

( * ) Notice: Subject to any disclaimer, the term of this patent is extended or adjusted under 35 U.S.C. 154(b) by 0 days.

(21) Appl. No.: 12/242,575

(22) Filed: Sep. 30, 2008

(65) Prior Publication Data

US 2009/0147536 A1   Jun. 11, 2009

(30) Foreign Application Priority Data

Dec. 6, 2007   (CN)   ......................... 2007 1 0202881

(51) Int. Cl.
*G02B 6/00* (2006.01)
(52) U.S. Cl. ........................... 362/27; 362/551; 362/555
(58) Field of Classification Search ................... 362/26, 362/27, 511, 551, 555, 582, 602, 628, 558, 362/610
See application file for complete search history.

(56) References Cited

U.S. PATENT DOCUMENTS 6,474,859 B2 * 11/2002 Lepley et al. ................. 362/26
6,969,834 B2 * 11/2005 Kaji et al. .................... 362/551
7,147,356 B2 * 12/2006 Tamaki ........................ 362/555
7,458,708 B2 * 12/2008 Sheng ......................... 362/551
2004/0066659 A1 *  4/2004 Mezei et al. ................. 362/555
2007/0018185 A1 *  1/2007 Hung ......................... 362/551
2009/0021957 A1 *  1/2009 Wu ............................ 362/555

FOREIGN PATENT DOCUMENTS

| CN | 1395059 A | 2/2003 |
|----|-----------|--------|
| JP | 2002-196150 A | 7/2002 |

* cited by examiner

*Primary Examiner*—Y My Quach Lee
(74) *Attorney, Agent, or Firm*—Andrew C. Cheng

(57) ABSTRACT

An exemplary illuminating device includes a light guide member and a light source. The light guide member includes an annular main body and at least one light incident portion extending from and optically coupled to the annular main body. The light source is optically coupled to the at least one light incident portion. The annular main body has a light emitting surface. The annular main body has a plurality of micro protrusions formed on the light emitting surface.

15 Claims, 7 Drawing Sheets

ILLUMINATING DEVICE

BACKGROUND

1. Technical Field

The present invention generally relates to an illuminating device.

2. Discussion of Related Art

Nowadays, annular illuminating devices are widely used due to their wide illumination area. Annular illuminating devices usually employ fluorescent lamps as light sources. However, fluorescent lights contain hazardous materials such as mercury, are large, and have a short service life.

Therefore, what is needed is an annular illuminating device that overcomes the above described shortcomings.

SUMMARY

An illuminating device, in accordance with a present embodiment, is provided. The illuminating device includes a light guide member and at least one light source. The light guide member includes an annular main body and at least one light incident portion extending from and optically coupled to the annular main body. The at least light source is optically coupled to the at least one light incident portion. The annular main body has a light emitting surface. The annular main body has a plurality of micro protrusions formed on the light emitting surface for reducing total internal reflection of the light, thereby enabling emission of the light from the light emitting surface.

Detailed features of the present illuminating device will become more apparent from the following detailed description and claims, and the accompanying drawings.

BRIEF DESCRIPTION OF THE DRAWINGS

Many aspects of the present illuminating device can be better understood with reference to the following drawings. The components in the drawings are not necessarily drawn to scale, the emphasis instead being placed upon clearly illustrating the principles of the present illuminating device. Moreover, in the drawings, like reference numerals designate corresponding parts throughout the several views, wherein.

DETAILED DESCRIPTION

Reference will now be made to the drawings to describe the embodiments of the present illuminating device, in detail.

Figure 1:
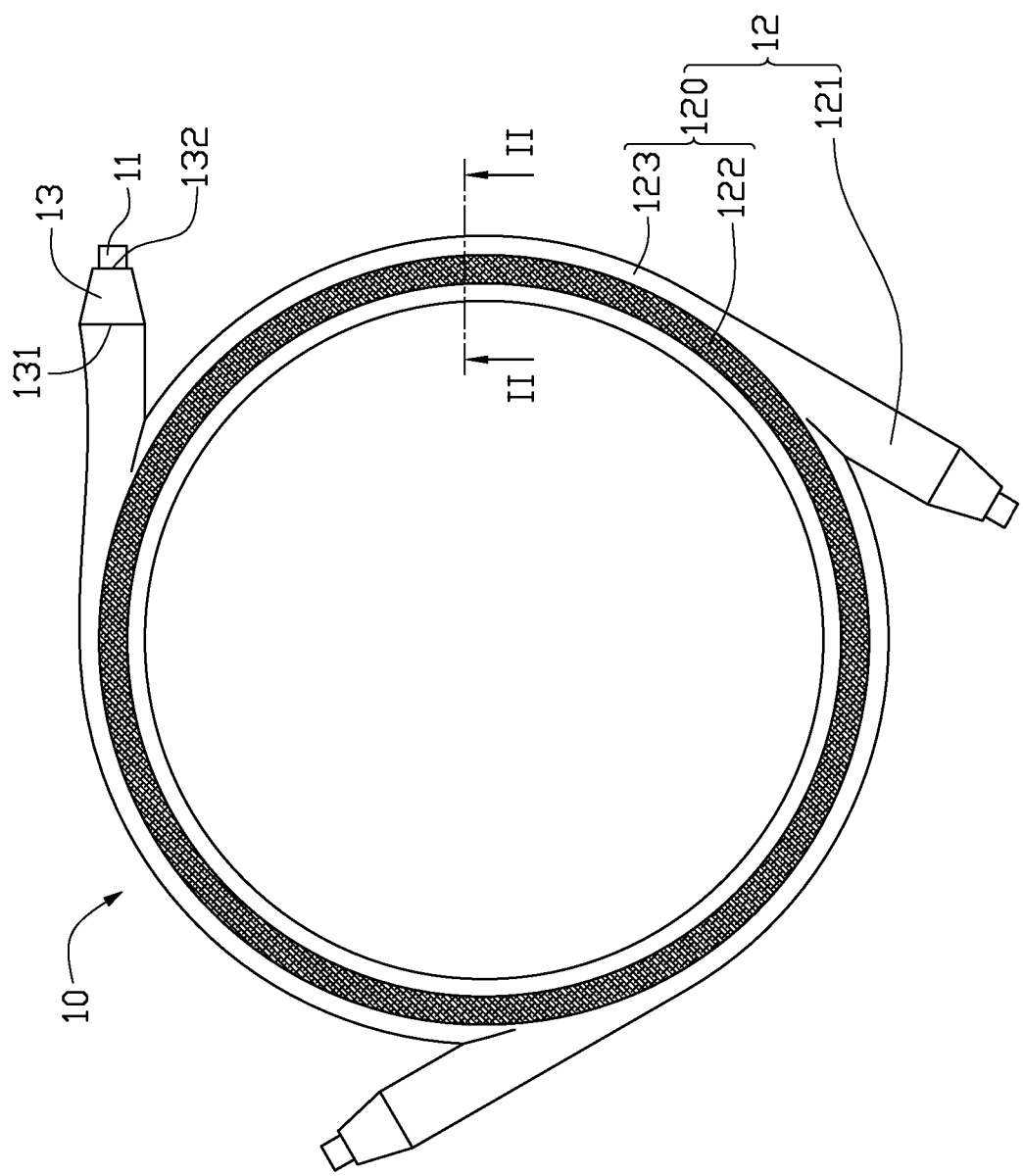
FIG. 1 is a schematic isometric view of an illuminating device, according to a first exemplary embodiment.

Referring to FIG. 1, an illuminating device 10 according to a first exemplary embodiment is provided. The illuminating device 10 includes at least one light source 11 and a light guide member 12.

The light guide member 12 includes an annular main body 120, and at least one light incident portion 121 extending outward from the annular main body 120. Preferably, the light incident portion 121 extends along a direction tangent to the annular main body 120. The annular main body 120 has a solid structure and includes an annular light emitting surface 122 and an annular light transmitting portion 123. The light emitting surface 122 is defined on an outer surface of the annular main body 120.

Figure 2:
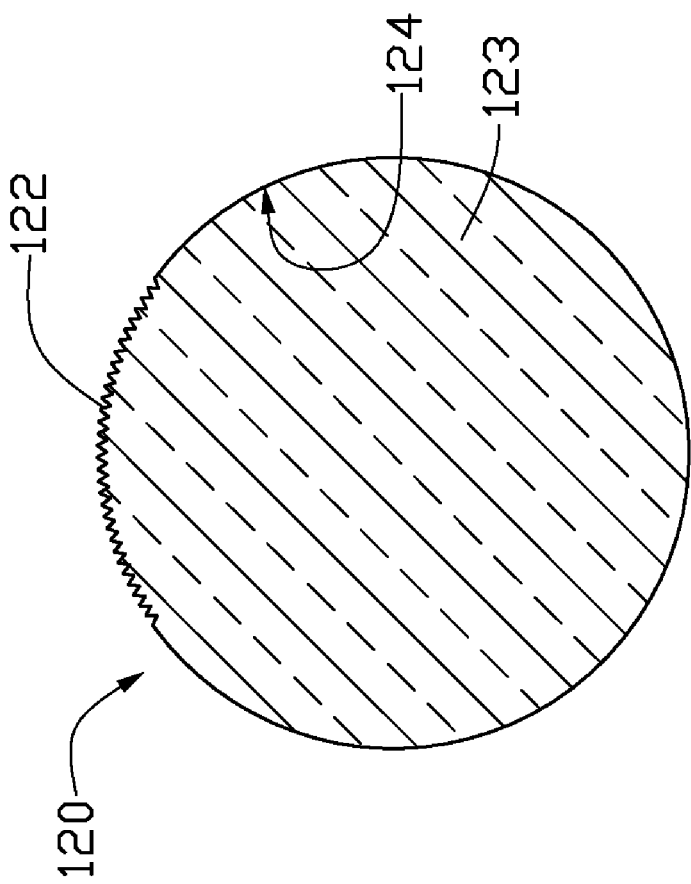
FIG. 2 is a cross sectional view of the illuminating device, taken along II-II of FIG. 1.

The light guide member 12 is made of silica gel, resin, glass, polymethylmethacrylate or quartz. The refractive index of the light guide member 12 is in a range of 1.4~1.6. Referring to FIG. 2, light emitted from the light source 11 will be reflected by an interface 124 of the light transmission portion 123 adjacent to the atmosphere, so that all available light eventually strikes the light emitting surface 122. The light emitting surface 122 has a plurality of micro protrusions formed thereon, and the micro protrusions enable the light to emit from the light emitting surface 122.

The light source 11 is arranged towards the light incident portion 121 and optically coupled to the light incident portion 121. Thereby, the light emitted from the light source 11 will be incident on the light transmitting portion 123 via the light incident portion 121. In this exemplary embodiment, the light source 11 includes three light emitting diodes (LEDs) arranged around the light guide member 12 and the three LEDs are equidistantly spaced from each other. In this embodiment, the light source 11 has a beam divergence angle no greater than 30 degree.

Figure 3:
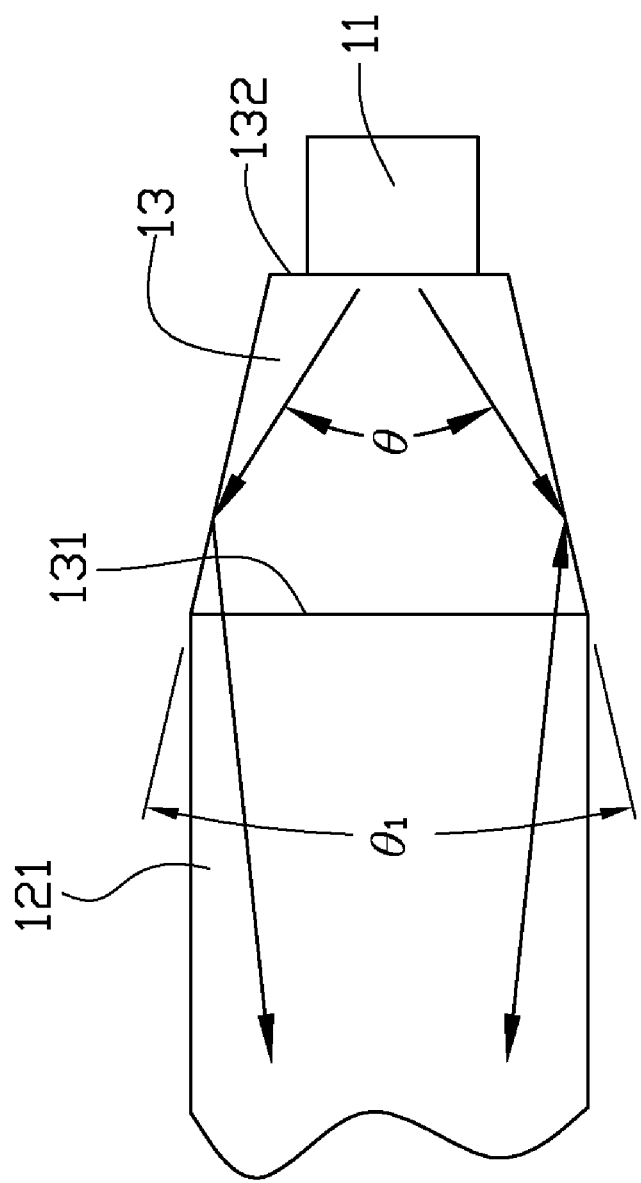
FIG. 3 is a schematic view of a light source, a light guiding member, and a light incident portion of the illuminating device of FIG. 1.

The illuminating device 10 further includes at least one light guiding member 13 arranged between the light source 11 and the light incident portion 121. The light guiding member 13 is configured for guiding the light emitted from the light source 11 to the light incident portion 121. Referring to FIG. 3, the light guiding member 13 tapers from the light incident portion 121 to the light source 11. The light guiding member 13 is taper-shaped, and the light guiding member 13 has a cone apex angle no greater than 30 degree. The light guiding member 13 can be a light reflector with a conical reflecting internal surface, thereby converges the light emitted from the light source 11 and enhance the light out-coupling efficiency. It is to be said that, the light guiding member 13 can also be a light converging lens.

Figure 4:
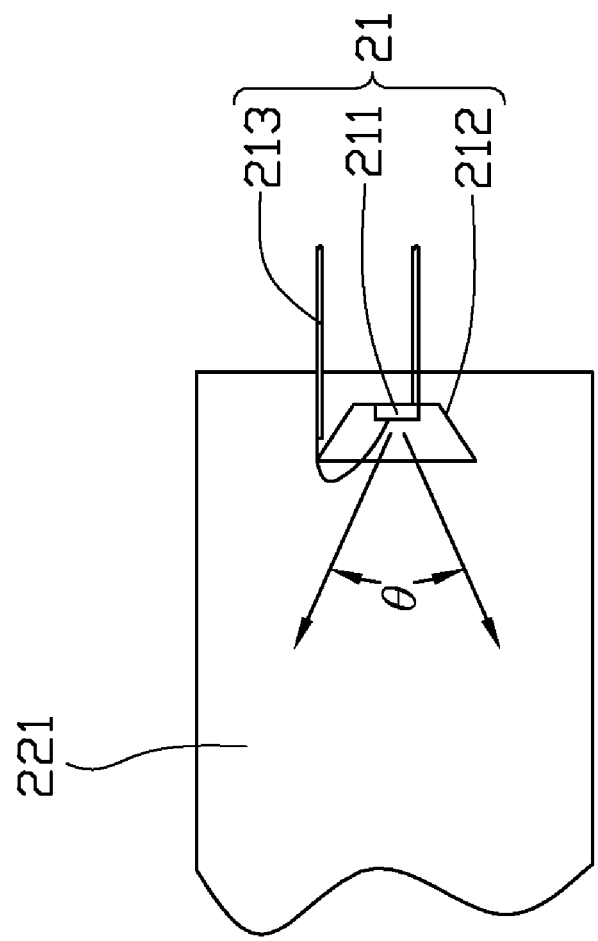
FIG. 4 is a schematic isometric view of an illuminating device, according to a second exemplary embodiment.

Referring to FIG. 4, a light source 21 and a light incident portion 221 of an illuminating device according to a second exemplary embodiment is provided. The light source 21 and the light incident portion 221 are generally similar to that of the illuminating device 10. The difference is that, the light source 21 is embedded in the light incident portion 221.

The light source 21 includes a light emitting chip 211, a reflector cup 212 and a lead frame 213. The light emitting chip 211 is arranged at bottom of the reflector cup 212. The light emitting chip 211 and the reflector cup 212 is encapsulated in an interior of the light incident portion 221, thereby enhance the light out-coupling efficiency. The lead frame 213 partly extends out of the light incident portion 221, thereby capable of being connected to an external power supply (not illustrated). The reflector cup 212 has predetermined height and opening scale, thereby limits the beam divergence angle of the light source 21 to be no greater than 30 degrees. The light incident portion 221 and the light source 21 are molded integrative.

Figure 5:
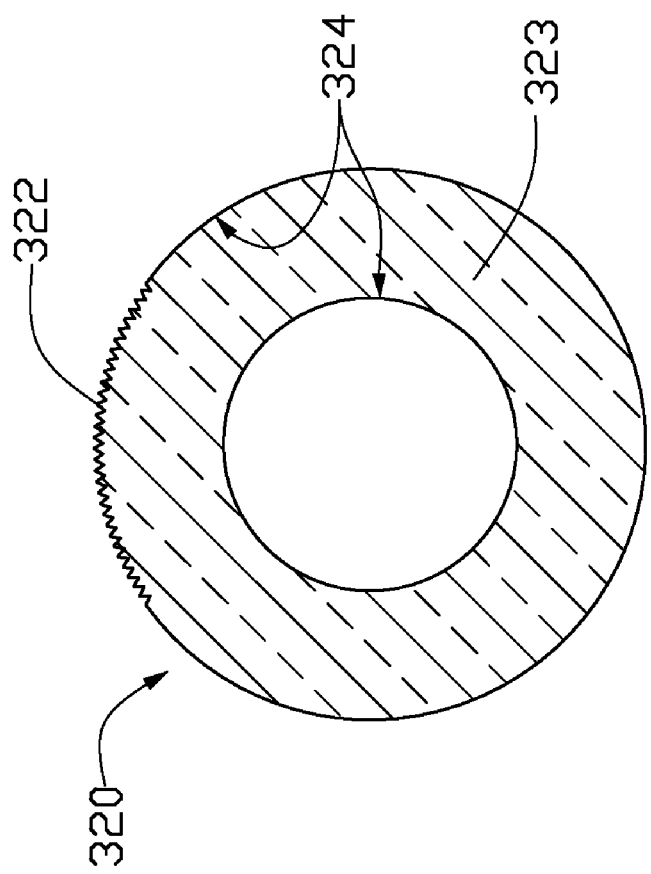
FIG. 5 is a cross sectional view of a light guide member of an illuminating device, according to a third exemplary embodiment.

Referring to FIG. 5, an annular main body 320 of an illuminating device according to a third exemplary embodiment is provided. The annular main body 320 is generally similar to that of the illuminating device 10. The difference is that, the annular main body 320 is tubular. The light emitted from the light source (not illustrated) will be totally internal reflected at an interface 324 of the light transmission portion 323.

Figure 6:
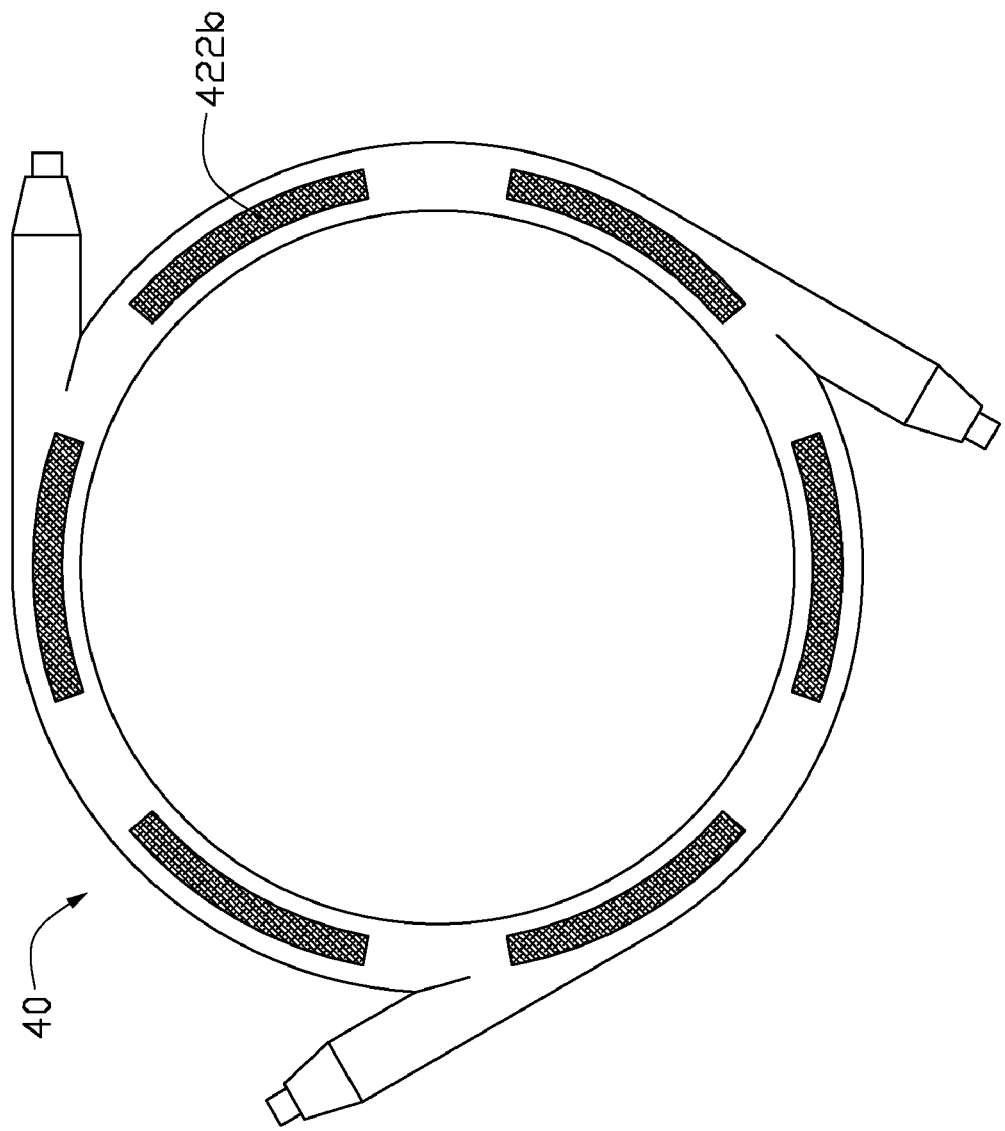
FIG. 6 is a schematic isometric view of an illuminating device, according to a fourth exemplary embodiment.

Referring to FIG. 6, an illuminating device 40 according to a fourth exemplary embodiment is provided. The illuminating device 40 has a configuration generally similar to the illuminating device 10. The illuminating device 40 also includes a light guide member with an annular main body. The difference is that, the light guide member further includes a plurality of light emitting surface sections 422b arranged on an outer surface of the annular main body and the plurality of light emitting surface sections 422b are spaced from each other.

Figure 7:
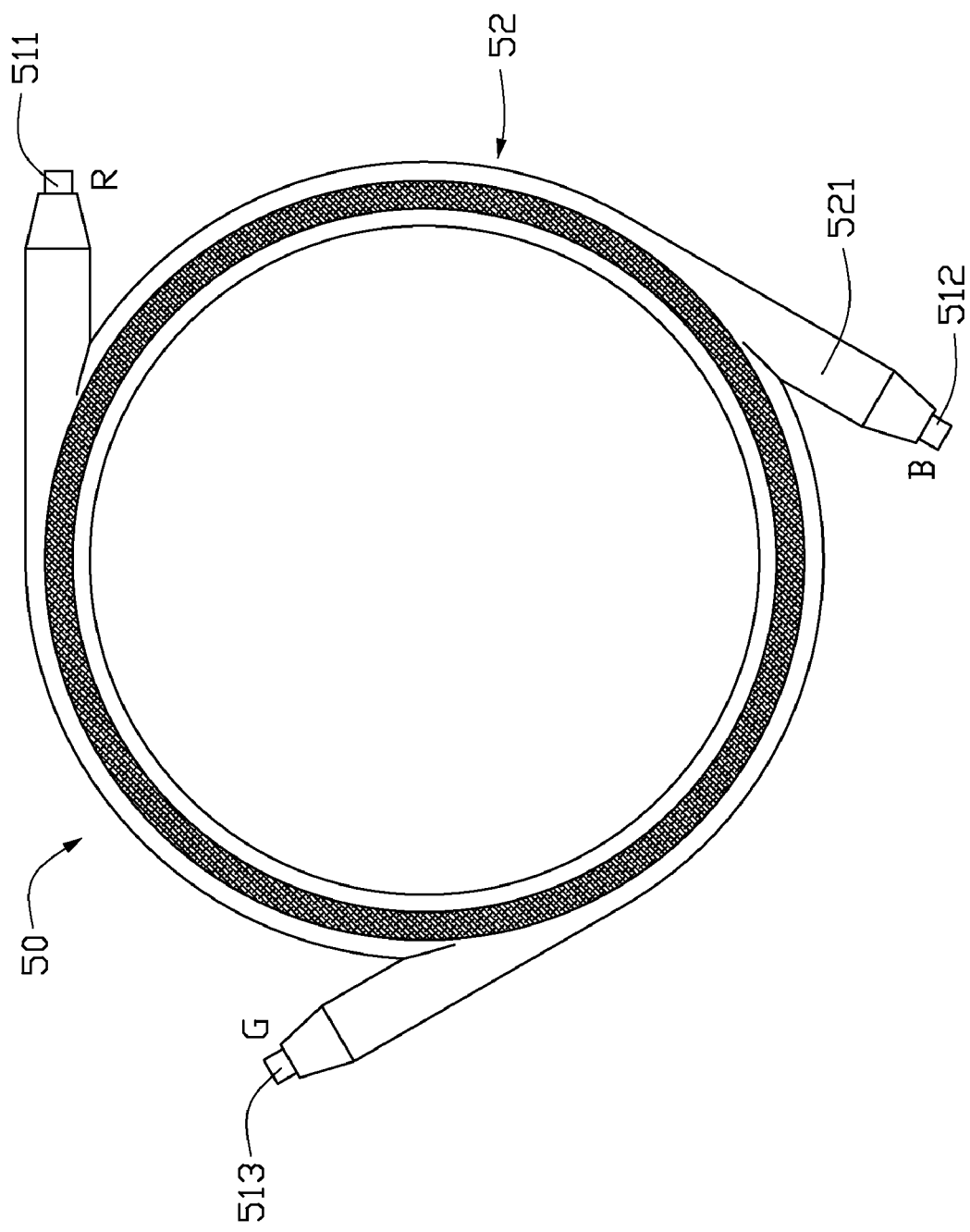
FIG. 7 is a schematic isometric view of an illuminating device, according to a fifth exemplary embodiment.

Referring to FIG. 7, an illuminating device 50 according to a fifth exemplary embodiment is provided. The illuminating device 50 has a configuration generally similar to the illuminating device 10. The illuminating device 50 also includes a light source, and a light guide member 52, which has a light incident portion 521. The difference is that, the light source includes at least one red LED 511, one blue LED 512, and one green LED 513. The red LED 511, the blue LED 512 and the green LED 513 are optically coupled to the light incident portion 512. Thereby, light emitted respectively by the red LED 511, the blue LED 512 and the green LED 513 are mixed in the interior of the light guide member 52.

The red LED 511 emits red light having wavelengths in a range of 590~700 nanometers, the blue LED 512 emits blue light having wavelengths in a range of 420~470 nanometers, and the green LED 513 emits green light having wavelengths in a range of 500~570 nanometers. In this embodiment, the red LED 511, the blue LED 512 and the green LED 513 are alternately arranged around the light guide member 52.

Furthermore, the red LED 511, the blue LED 512 and the green LED 513 are respectively connected to an external power supply (not illustrated). The external power supply can light up the red LED 511, the blue LED 512 and the green LED 513 with predetermined brightness and emission time.

Finally, it is to be understood that the above-described embodiments are intended to illustrate rather than limit the invention. Variations may be made to the embodiments without departing from the spirit of the invention as claimed. The above-described embodiment illustrates the scope of the invention but do not restrict the scope of the invention.

What is claimed is:

1. An illuminating device, comprising:
a light guide member comprising an annular main body and at least one light incident portion extending from and optically coupled to the annular main body, the annular main body being tubular and comprising a light transmitting portion bounded by an inner circumference surface and an outer circumference surface of the annular main body, the annular main body having a light emitting surface on the outer circumference surface;
at least one light source optically coupled to the at least one light incident portion; and
a light guiding member arranged between the at least one light source and the at least one light incident portion;
wherein the annular main body has a plurality of micro protrusions formed on the light emitting surface for reducing total internal reflection of the light, thereby enabling emission of the light from the light emitting surface; and
wherein the light guiding member is configured for guiding the light emitted from the at least one light source to the at least one light incident portion.

2. The illuminating device according to claim 1, wherein the light guide member is made of a material selected from a group consisting of silica gel, resin, glass, polymethylmethacrylate and quartz.

3. The illuminating device according to claim 1, wherein the at least one light incident portion extends along a direction tangential to the annular main body.

4. The illuminating device according to claim 1, wherein the at least one light source includes a plurality of light sources and the at least one light incident portion includes a plurality of light incident portions, and the light sources are equidistantly spaced from each other.

5. The illuminating device according to claim 1, wherein the at least one light source is a light emitting diode.

6. The illuminating device according to claim 5, wherein the light emitting diode is embedded in the at least one light incident portion.

7. The illuminating device according to claim 1, wherein the light guiding member tapers from the at least one incident portion to the at least one light source.

8. The illuminating device according to claim 7, wherein the light guiding member is a light reflector with a conical reflecting internal surface or a light converging lens.

9. The illuminating device according to claim 7, wherein the light guiding member is conical with a cone apex angle not greater than 30 degrees.

10. The illuminating device according to claim 1, wherein the light source has a beam divergence angle of not greater than 30 degrees.

11. The illuminating device according to claim 1, wherein the light emitting surface is annular.

12. The illuminating device according to claim 1, wherein the light emitting surface includes a plurality of spaced light emitting surface sections.

13. The illuminating device according to claim 1, wherein the plurality of micro protrusions formed on the light emitting surface are prism-like protrusions.

14. The illuminating device according to claim 1, wherein the illuminating device comprises a plurality of light sources, the plurality of light sources are capable of emitting a plurality kinds of light with different colors.

15. The illuminating device according to claim 1, wherein the illuminating device comprises three light sources emitting red light, blue light, and green light respectively.

* * * * *